United States Patent
Alkalay et al.

(10) Patent No.: US 11,620,068 B2
(45) Date of Patent: Apr. 4, 2023

(54) DATA TRANSFER OPTIMIZATIONS

(71) Applicant: EMC IP Holding Company LLC, Hopkinton, MA (US)

(72) Inventors: Amitai Alkalay, Kadima (IL); Lior Kamran, Rishon LeZion (IL); Vasu Subramanian, Chapel Hill, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/142,557

(22) Filed: Jan. 6, 2021

(65) Prior Publication Data

US 2022/0214812 A1 Jul. 7, 2022

(51) Int. Cl.
G06F 3/06 (2006.01)

(52) U.S. Cl.
CPC ............ G06F 3/065 (2013.01); G06F 3/0619 (2013.01); G06F 3/0679 (2013.01)

(58) Field of Classification Search
CPC ....... G06F 3/065; G06F 3/0619; G06F 3/0679
See application file for complete search history.

(56) References Cited

U.S. PATENT DOCUMENTS

| | | | | |
|---|---|---|---|---|
| 8,239,734 B1* | 8/2012 | Shalvi | ................. | G06F 11/1092 714/763 |
| 9,836,243 B1* | 12/2017 | Chanler | ............. | G11C 16/3495 |
| 2011/0055232 A1* | 3/2011 | Graefe | .................... | G06F 12/08 707/752 |
| 2013/0246891 A1* | 9/2013 | Manning | ............... | G06F 3/0688 714/752 |
| 2014/0281323 A1* | 9/2014 | Duluk, Jr. | ........... | G06F 12/1009 711/165 |
| 2014/0281324 A1* | 9/2014 | Duluk, Jr. | ............... | G06F 12/08 711/165 |
| 2017/0344285 A1* | 11/2017 | Choi | ..................... | G06F 3/0665 |
| 2018/0373641 A1* | 12/2018 | Partap Singh Rana | | ...................... G06F 11/34 |
| 2019/0339872 A1* | 11/2019 | Kucherov | ........... | G06F 11/2094 |
| 2020/0110537 A1* | 4/2020 | Hahn | ...................... | G06F 3/061 |

* cited by examiner

*Primary Examiner* — Nanci N Wong
(74) *Attorney, Agent, or Firm* — Muirhead and Saturnelli, LLC

(57) ABSTRACT

Techniques for performing data transfers may include determining a first page of user data to be transferred from a source data storage system to a target data storage system, wherein the source data storage system has a source page size granularity denoting a first size of backend I/O operations on the source data storage system, wherein the target data storage system has a target page size granularity denoting a second size of backend I/O operations on the target data storage system; performing processing on the source data storage system that constructs a second page of user data that is the second size, wherein the second page of user data includes the first page of user data that is the first size and another page of user data that is the first size; and transferring the second page of user data from the source to the target data storage system.

18 Claims, 9 Drawing Sheets

DATA TRANSFER OPTIMIZATIONS

BACKGROUND

Technical Field

This application generally relates to data storage.

Description of Related Art

A data storage system may include different resources used by one or more host processors. The resources and the host processors in the system may be interconnected by one or more communication connections, such as network connections. These resources may include data storage devices such as those included in the data storage system. The data storage system may be coupled to one or more host processors and provide storage services to each host processor. Multiple data storage systems from one or more different vendors may be connected and may provide common data storage for the one or more host processors.

A host may perform a variety of tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for performing data transfers comprising: determining a first page of user data to be transferred from a source data storage system to a target data storage system, wherein the source data storage system has a source page size granularity denoting a first size of backend I/O operations on the source data storage system, wherein the target data storage system has a target page size granularity that is different from the source page size granularity and denotes a second size of backend I/O operations on the target data storage system, wherein the first page of user data is the first size and the first page of user data is stored at a first logical address of a logical device; performing first processing on the source data storage system that constructs a second page of user data that is the second size, wherein the second page of user data includes the first page of user data and an additional page of user data that is the first size; and transferring the second page of user data from the source data storage system to the target data storage system.

In at least one embodiment, processing may include receiving the second page of user data at the target data storage system; and performing a single backend write operation on the target data storage system, wherein the single backend write operation writes the second page of user data on a first backend non-volatile storage device of the target data storage system, wherein the first page of user data and the additional page of user data are stored at consecutive locations on the first backend non-volatile storage device of the target data storage system. Processing may include storing the second page of user data as a first record in a log file of the target data storage system; and flushing the first record from the log file of the target data storage system, wherein said flushing the first record includes performing the single backend write operation on the target data storage system that writes the second page of user data on the first backend non-volatile storage device of the target data storage system. The first page of user data and the additional page of user data may be stored at sequential consecutive logical addresses of the logical device. The source data storage system may use only non-volatile solid state drives (SSDs) as backend storage devices. The non-volatile SSDs may include flash-based storage devices. The target data storage system may include backend storage devices comprising non-volatile SSDs and rotating disk drives. The source data storage system may use first metadata to map user data pages to corresponding physical storage locations on the backend storage devices of the source data storage system. The target data storage system may use second metadata to map user data pages to corresponding physical storage locations on the backend storage devices of the target data storage system. The source data storage system may store user data pages and the first metadata on non-volatile SSDs, and the target data storage system may store the second metadata on non-volatile SSDs and at least some of user data pages on rotating disk drives.

In at least one embodiment, the second page of user data may be transferred from the source data storage system to the target data storage system in connection with replicating data of the logical device from the source data storage system to the target data storage system. Processing may include taking a first snapshot of the logical device on the first data storage system at a first point in time; taking a second snapshot of the logical device on the first data storage system at a second point in time; and determining the first page of user data as a data difference between the first snapshot and the second snapshot. Prior to determining the first page of user data, prior to performing the first processing and prior to transferring the second page of user data, the method may include establishing a replication session comprising sending the target page size granularity from the target data storage system to the source data storage system.

In at least one embodiment, the second page of user data may be transferred from the source data storage system to the target data storage system in connection with migrating data of the logical device from the source data storage system to the target data storage system.

In at least one embodiment, the backend I/O operations of the source data storage system may include read operations that each read an amount of data equal to the source page size granularity from a backend non-volatile physical storage device of the source data storage system, and wherein the backend I/O operations of the source data storage system may include write operations that each write an amount of data equal to the source page size granularity to a backend non-volatile physical storage device of the source data storage system. The backend I/O operations of the target data storage system include read operations that each read an amount of data equal to the target page size granularity from a backend non-volatile physical storage device of the target data storage system and wherein the backend I/O operations of the target data storage system include write operations that each write an amount of data equal to the target page size granularity to a backend non-volatile physical storage device of the target data storage system. The target page size granularity may be larger than the source page size granularity and the target page size granularity may be an integer multiple of the source page size granularity. The target page size granularity may be at least twice the source page size granularity.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
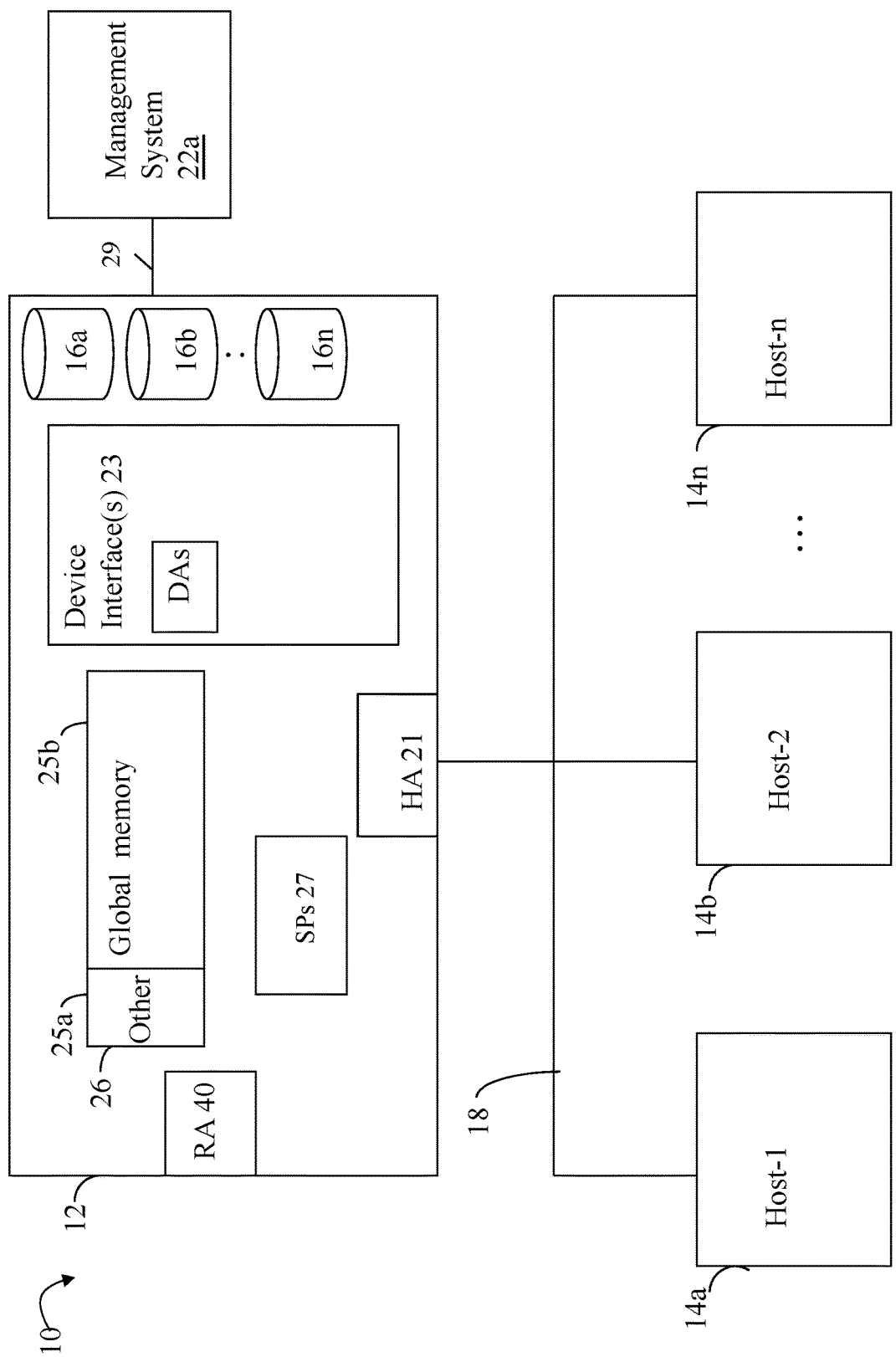
FIGS. 1 and 3 are examples of components that may be included in systems in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s)

23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDs 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different adapters, such as each HA, DA, RA, and the like, may be implemented as a hardware component including, for example, one or more processors, one or more forms of memory, and the like. Code may be stored in one or more of the memories of the component for performing processing. In other embodiments where the different adapters are not implemented as separate hardware components, the different adapters may denote logical processing performed generally by one or more CPUs or cores allocated to perform such logical processing of the different adapters.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on user data stored on the data storage system. For example, in at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like.

Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

An embodiment in accordance with the techniques herein may also provide a replication service or facility, such as remote replication facility, that provides for automatically replicating a storage object or entity of a first or source data storage system on a second or remote data storage system. The storage object may be, for example, a logical device or LUN, a file, file system, and the like. The replication facility may automatically mirror or replicate all writes performed to the source logical device on the first system to a duplicate target logical device on the second data storage system. The source and target logical devices may be configured to have the same size or capacity as well as have other matching characteristics in order to have the target logical device be a mirror of the source logical device. In this manner, the target logical device on the second or target data storage system may be used in the event of data unavailability or a disaster at the first data storage system. Generally, each logical device of the source system may be similarly configured for replication on the target system.

In at least one embodiment, the remote replication facility may use a technique referred to as a snapshot difference or snap diff technique. The snap diff technique provides for taking two successive snapshots of the logical device or other storage object on the source system that is replicated on the target system, and then determining the data difference with respect to the two successive snapshots. The data difference denotes the data blocks or pages that have been modified in the time interval from a first point in time to a second later point in time, where a first snapshot is taken at the first point in time and a second successive snapshot is taken at the second point in time. The time interval may correspond, for example, to a recovery point objective (RPO) defined as the maximum amount of allowable data loss, as measured by time, that can be lost after a recovery from a disaster, failure, or comparable event before data loss will exceed what is acceptable to an organization. The snap diff technique may provide for taking a snapshot at each RPO interval. For example, for an RPO of 5 hours, a snapshot of the logical device may be taken on the source system every 5 hours and compared to the immediately prior snapshot to determine the data differences including data pages or blocks that have been modified since the immediately prior snapshot. The data differences including the modified data pages or blocks of the logical device are then transferred from the source system to the target system and applied to the remote copy of the logical device on the remote system.

Figure 2:
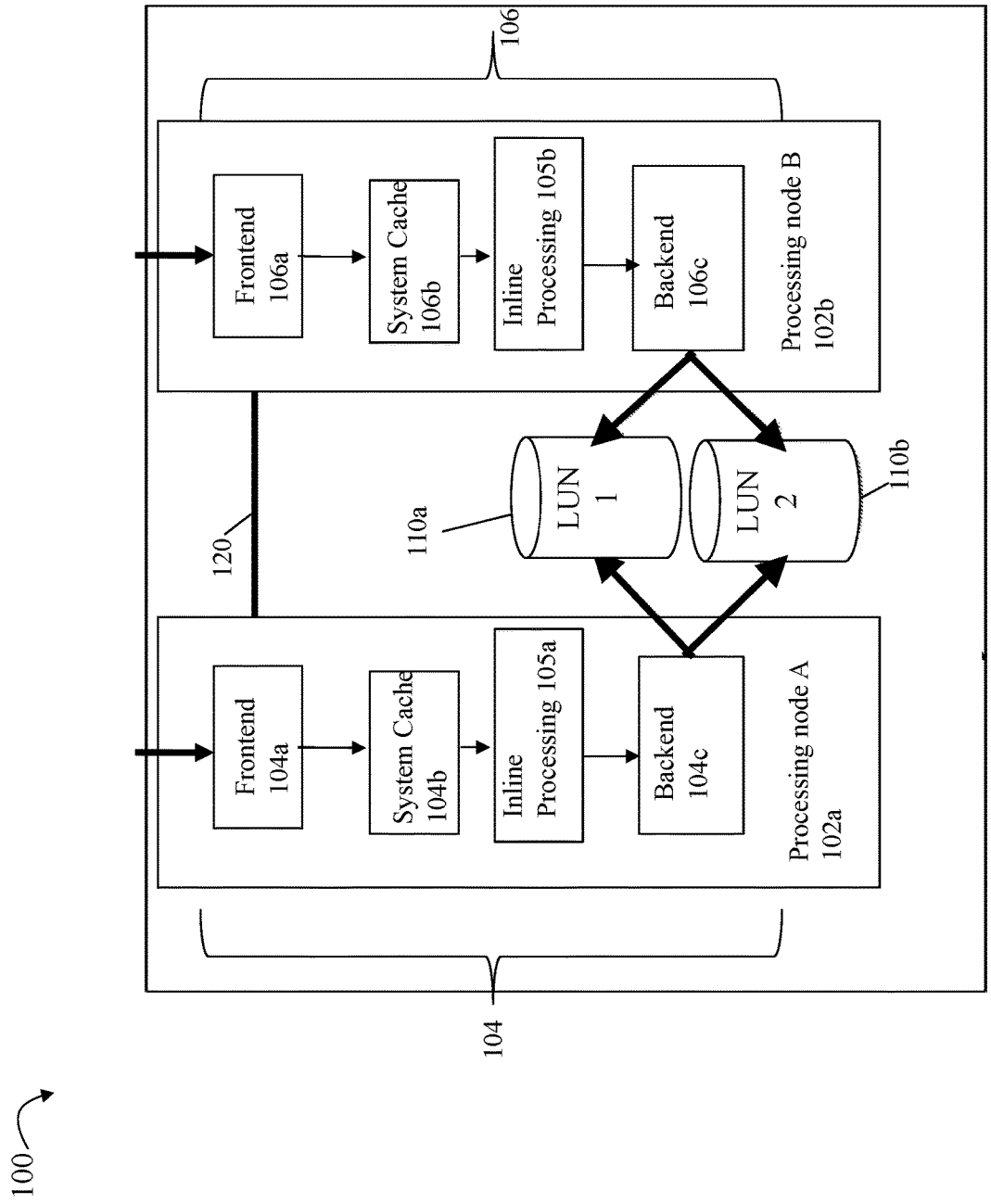
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data duplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the BE PDs. For example, in at least one embodiment, a RAM based memory may be one of the caching layers used as to cache the write data that is then flushed to the BE PDs. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by the one or more processors of each node. Each node of the pair may include its own resources such as its own processors, memory, cache and the like.

A data storage system may store data on its BE PDs in a page size granularity (sometimes also referred to and known as block size or block size granularity) such as 4K byte pages. In such a data storage system, user data as well as metadata may be stored in such fixed size pages. In such a data storage system, the BE I/O operations may also operate on data chunks or portions of the page size granularity. For example, in a data storage system having 4K byte pages, each single BE read operation that reads data from a BE PDs may read 4K bytes from the BE PD, and each single BE write operation that writes data to a BE PD may write 4K bytes to the BE PD. In at least one embodiment, the metadata may include mapping information, sometimes referred to as location information, used to map a logical address (e.g., a LUN and LBA as may be specified in a received I/O operation from a host) to a physical location on a BE PD including the user data stored at the logical address. As discussed elsewhere herein, the metadata may be used in connection with servicing I/O operations received on the data storage system. For example, the metadata including the mapping information may be used to obtain requested read data in response to a cache miss for the requested read data. As another example, the metadata including the mapping information may be used and updated when persistently storing user data written by a received host write I/O operation on a BE PD of the data storage system. Generally, a data storage system may persistently store both the user data and the associated metadata on BE PDs of the data storage system.

A first data storage system may be an all-flash array (AFA) or data storage system using only flash drives, or more generally SSDs, for its BE PDs. Another second data storage system may be characterized in one aspect as a hybrid data storage system using both flash drives and rotating disk drives for its BE PDs. More generally, the second or hybrid data storage system may use both SSDs and rotating disk drives for its BE PDs. There are configurations where the first data storage system may be connected to the second data storage system for any suitable purpose. For example, the first data storage system may be connected to the second data storage system to replicate or migrate data from the first data storage system to the second data storage system.

In the first data storage system, the metadata and the user data may be stored completely on flash drives or more generally SSDs. In the second data storage system, the metadata may be stored completely on flash drives or SSDs for performance reasons since the metadata is accessed frequently and random. For example, during I/O processing when reading data from or writing data to a logical address, the storage system needs to find the physical storage location of the requested data on the BE PDs which requires accessing the appropriate metadata. For example, in at least one system when reading data for a logical address from on a BE PD, multiple metadata pages are read in order to determine the physical location on the BE PD containing the requested read data. Therefore, the second storage system requires a high random read bandwidth for metadata since the metadata is typically accessed so frequently. Since rotating disk drives, sometimes also referred to herein as hard disk drives or HDDs, have a low random read performance, the metadata in the second or hybrid data storage system may be stored on the SSDs or flash drives of the BE PDs rather than HDDs. However, flash drives, and generally SSDs, may be more costly in comparison to the HDDs of the second hybrid data storage system. In this case, it may be desirable to reduce the amount of flash storage from the BE PDs used for storing the metadata. In at least one embodiment, the second hybrid data storage system may reduce the amount of flash storage consumed for metadata storage by increasing the page size granularity. For example, the second hybrid data storage system may have a page size granularity of 8K byte pages whereas the first data storage system (having BE PDs that are all flash drives or all SSDs) may have a page size granularity of 4K byte pages as noted above. In such a configuration, increasing the page size granularity from 4K bytes to 8K bytes generally reduces the total number of metadata pages by one half. In turn, structures used to implement and manage the metadata pages may be reduced in size and number since there are less metadata pages with the larger page granularity of 8K bytes. For example, in at least one embodiment, the metadata pages forming a mapping layer may be implemented as a hierarchical B-tree including 3 layers of metadata pages. Reducing the number of metadata pages may result in a B-tree with a reduced number of nodes, and thus, a reduction in the amount of flash storage consumed in storing the metadata management structure such as the B-tree.

When using a block or page size of 4K bytes on the first data storage system and a block or page size of 8K bytes on the second data storage system, data updates made on the first data storage system that are further replicated to, or synchronized with, the second data storage system may result in efficiencies. For example, performing the data updates on the second data storage system may result in performing read modify write operations (RMWs) or small writes. To further illustrate, assume a 4K byte page of user data is written to a first logical device of the first data storage system and the first logical device is replicated as a corresponding second logical device on the second data storage system. Subsequently, the 4K byte page of user data containing the newly written data is then transferred from the first data storage system to the second data storage system as part of replication processing. However, since the second data storage system has a page size of 8K bytes, the second data storage system performs BE I/O operations on 8K byte pages. On the second data storage system, the current contents of the 4K byte page of user data is included in a larger 8K byte page of user data. In at least one system, the 8K byte page of user data is read from the BE PDs of the second data storage system into a buffer or cache location. The buffer or cache location may then be updated, modified or partially overwritten to include the updated 4K byte page of user data. Subsequently the updated 8K byte page stored at the buffer or cache location may then be written out to the BE PDs. Thus, writing random updated 4K byte pages of user data on the second hybrid system may be implemented using random RMWs for user data stored on the HDDs. Such random reads for the HDDs performed in connection with the random RMWs result in adverse performance on the second hybrid system and also adversely affects the overall data transfer bandwidth in connection with the data transfers between the first and second data storage systems.

Thus, as noted above, there may be two adverse performance implications for the second hybrid data storage system. A first adverse performance effect is due to storing the user data on the HDDs of the BE PDs. A second adverse performance effect is due to the additional processing performed due to the RMWs to compensate for the page sizes differences on the first and second data storage systems.

Described in the following paragraphs are techniques that may be used in connection with optimizing the data transfer between the first data storage system and the second data storage system. The first data storage system may have a first page size that is smaller than a second page size the second data storage system. The techniques may include having the first data storage system construct a target user data page or chunk that is the second page size granularity of the second data storage system. In at least one embodiment, the techniques utilize the high read bandwidth provided by the first data storage system to have the first data storage system read additional user data from the SSDs comprising the BE PDs of the first data storage system to form the target user data page having the larger second page size of the second data storage system. In this manner, the techniques herein avoid having the second data storage system perform the RMWs and avoid having the second data storage system construct a full user data page of the second page size from received user data having the smaller first page size.

In at least one embodiment, the first data storage system may have a 4K page size granularity and may have BE PDs that are all flash drives or SSDs. The second or hybrid data storage system may have an 8K page size granularity and may have BE PDs that include both flash drives or SSDs as well as HDDs. The first data storage system may construct a target page of user data having a size equal to the 8K page size granularity of the second hybrid data storage system. Rather than read and transfer 4K bytes of new or updated user data, the first data storage system may read an aligned 8K byte user data chunk corresponding to the 8K byte target page of user data on the second data storage system. In particular, the 8K byte user data chunk may be constructed by having the first data storage system issue 2 BE read operations each reading 4K bytes of user data forming the 8K byte user data chunk. One of the 2 BE read operations reads the 4K bytes of new or updated user data, and the other BE read operation reads an additional 4K bytes of user data as currently stored on the first and second data storage systems. The 8K byte user data chunk, denoting the constructed target page of user data, includes the 4K bytes of new or updated user data along with the additional 4K bytes of user data. The 8K byte user data chunk (denoting the target page of user data constructed by the first data storage system) is transferred from the first to the second data storage system. The second data storage system may then perform a single page write of the target page including 8K bytes of user data to the HDDs included in the BE PDs of the second data storage system. In this manner, the second data storage system may perform the foregoing single 8K byte page write or single BE write operation to the HDDs rather than a RMW operation.

The techniques herein may be used in connection with data transfers from the first data storage system to the second data storage system in connection with data replication, such as remote data replication from the first or source data storage system to a second or target data storage system. More generally, the techniques herein may also be used in connection with other applications such as data migration.

In at least one embodiment, data replication may be performed with respect to storage objects or entities such as logical devices. For example, a logical device on the first data storage system may be configured for replication in an ongoing manner to the second data storage system. In this case, the first data storage system is also the source system with respect to the replication, and the second data storage system is also the target system with respect to the replication. Consistent with other discussion herein, the replication facility may automatically mirror or replicate all writes performed to the source logical device on the first system to a duplicate target logical device on the second data storage system. The source and target logical devices may be configured to have the same size or capacity as well as have other matching characteristics in order to have the target logical device be a mirror of the source logical device. In this manner, the target logical device on the second or target data storage system may be used in the event of data unavailability or a disaster at the first data storage system. Generally, each logical device of the source system may be similarly configured for replication on the target system.

In connection with data migration, the techniques herein may be used in connection with migrating the data of one or more logical devices of the first data storage system to one or more corresponding logical devices of the second data storage system.

The foregoing and other aspects of the techniques herein are described in more detail in following paragraphs.

In the following paragraphs, the first data storage system is described as having a block or page size of 4K bytes and the second data storage system is described as having a block or page size of 8K bytes as noted above. However, more generally, any suitable pages sizes or pages size granularities may be used. For example, the first data storage system may have a first page size, the second data storage system may have a second page size that is larger than the first page size, and the second page size may be an integer multiple of the first page size. For example, as a variation, the first page size may be 4K bytes and the second page size may be 12K bytes. In this latter variation, the first data storage system would construct a target page of 12K bytes of user data by performing 3 BE read operation from the BE PDs of the first data storage system, where each of the 3 BE read operations reads a 4K byte page of user data.

Also in the following paragraphs, reference is made regarding use of the techniques herein in connection with data transfers from the first data storage system to the second data storage system in connection with data replication. More generally, the techniques herein may also be used in connection with other suitable applications such as data migration.

Figure 3:
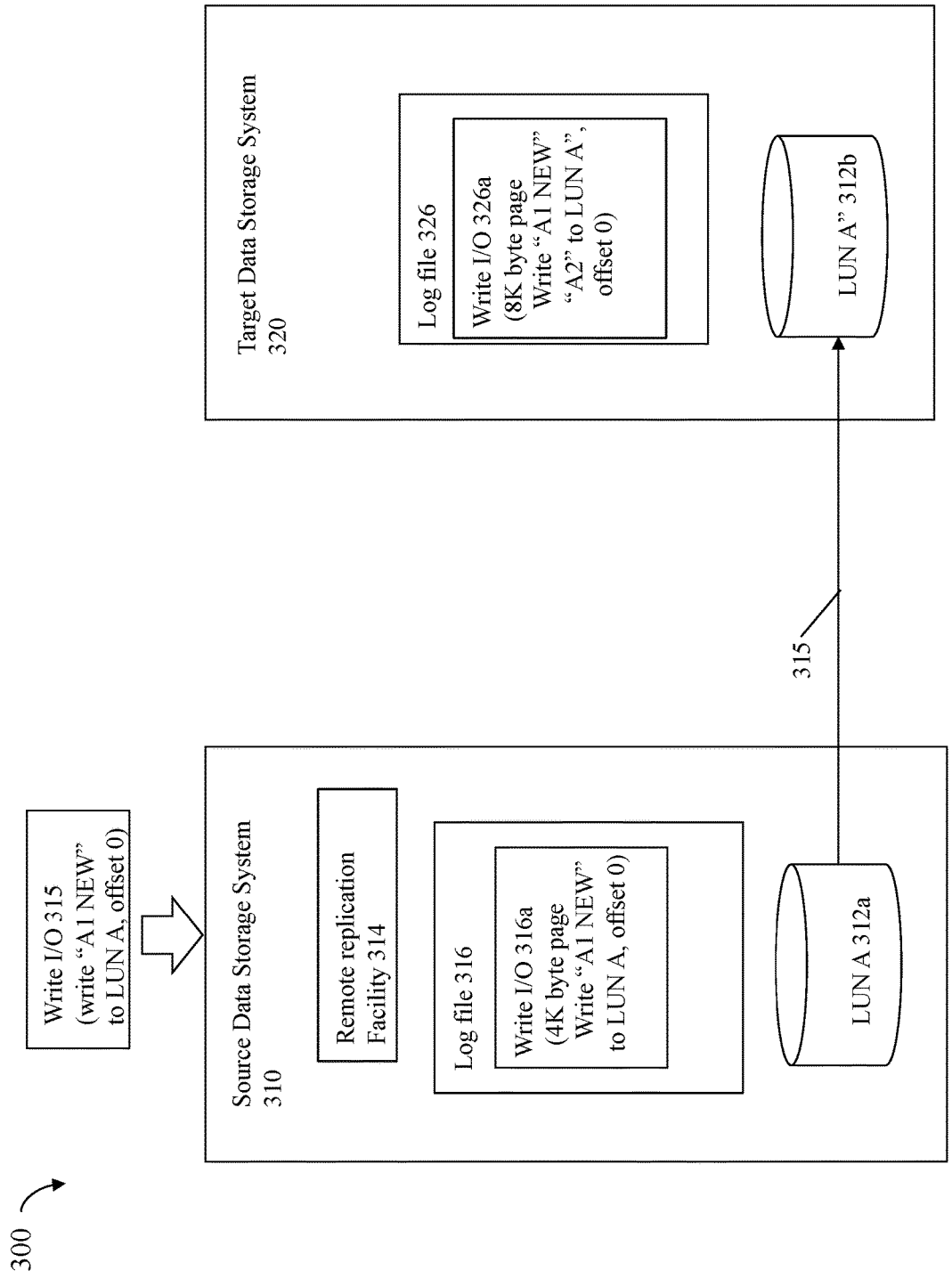

Referring to FIG. 3, shown is an example 300 of an embodiment of systems that may utilize the techniques herein.

The example 300 includes a source data storage system 310 and a target data storage system 320. The source data storage system 310 includes a remote replication facility 314, a log file 316 and a LUN A 312a. The target data storage system 320 includes a log file 326 and a LUN A" 312b. Generally, the systems 310, 320 may include other elements of data storage system such as described elsewhere herein but which are omitted for simplicity of illustration.

The source data storage system 310 may be, for example, the first data storage system described above as the AFA or all flash data storage system with a 4K byte block or page size. The target data storage system 320 may be, for example, the second data storage described above as the hybrid data storage system with an 8K byte bock or page size. The LUN A 312a may denote a logical device of the source system 310 that is replicated on the target system 320 as the LUN A" 312b. The replication of the LUN A 312a as the LUN A" 312b may be performed by a remote replication facility 314. In at least one embodiment, the remote replication facility 314 of the source system 310 may use the snap diff technique as described elsewhere herein in connection with determining user data pages or blocks of the LUN A 312a that have been modified. The modified user data pages or blocks are then transferred 315 from the source system 310 to the target system 320 and written to the LUN A" 312b.

For simplicity of illustration, the techniques herein are described with respect to remote replication of a single logical device, LUN A 312a, of the source system. More generally, many source logical devices of the source system 310 may be configured to have corresponding remote counterpart target logical devices on the target system 320, where the replication facility provides for remotely replicating data of the source logical devices in an ongoing continuous manner to the remote target logical devices.

Figure 4:
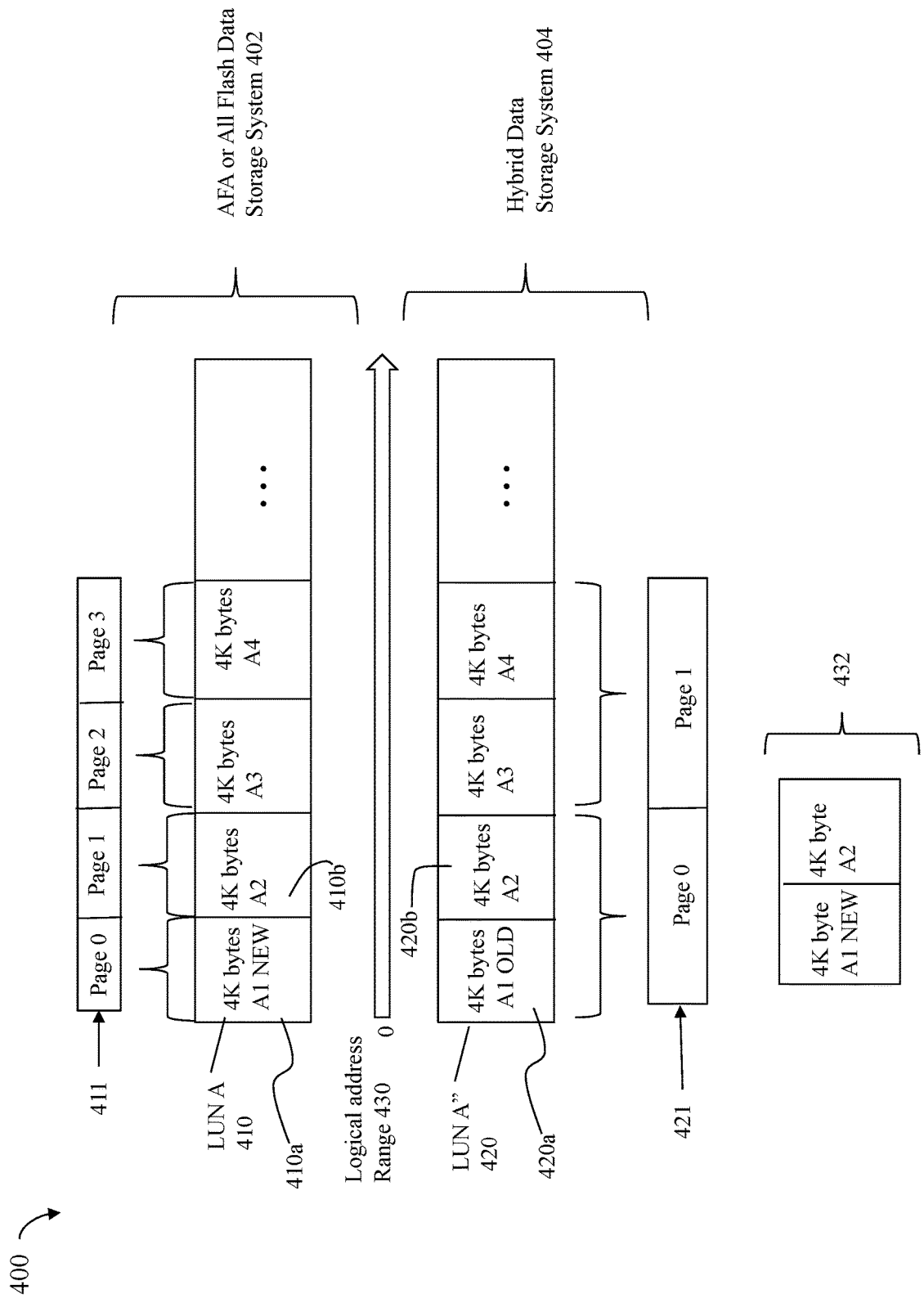
FIG. 4 is an example illustrating different page size granularities of user data of a logical address space in an embodiment in accordance with the techniques herein.

Referring to FIG. 4, shown is an example 400 illustrating the different page size granularities of the source and target data storage systems in at least one embodiment in accordance with the techniques herein. As noted above, the AFA or all flash data storage system is the source system 310 having a 4K byte page size granularity and the hybrid data storage system is the target system 320 having an 8K byte page size granularity.

The element 402 illustrates a logical data layout of the LUN A 410 on the AFA having the 4K byte page size. The element 430 denotes the logical address range or offset for the LUNs A and A" shown as increasing in logical addresses from left to right with 0 as the minimum or starting logical address. The element 410 illustrates the 4K byte user data pages or blocks stored on the LUN A on the AFA or source system 310. The element 411 indicates the pages of user data as stored on the LUN A where the entire logical address range or space may be partitioned into 4K byte pages or blocks. On the source system or AFA, BE I/O operations are performed by reading and writing 4K byte aligned data chunks as denoted by the pages 411. The elements 410 and 411 taken together denote that page 0 of the LUN A on the AFA includes the 4K page of user data denoted as A1 NEW, page 1 of the LUN A on the AFA includes the 4K page of user data denoted as A2, page 2 of the LUN A on the AFA includes the 4K page of user data denoted as A3, and page 3 of the LUN A on the AFA includes the 4K page of user data denoted as A4.

The element 404 illustrates a logical data layout of the LUN A" 420 on the hybrid or target system having the 4K byte page size. The element 420 illustrates the 4K byte user data chunks stored on the LUN A" on the hybrid or target system 320. The element 421 indicates the 8K byte pages of user data as stored on the LUN A" where the entire logical address range or space may be partitioned into 8K byte pages or blocks based on the 8K byte page granularity of the target or hybrid system. On the target or hybrid system, BE I/O operations are performed by reading and writing 8K byte aligned data chunks as denoted by the pages 421. The elements 420 and 421 taken together denote that page 0 of the LUN A" on the hybrid or target system includes the 8K page of user data denoted as A1 OLD and A2, and page 1 of the LUN A" on the hybrid or target system includes the 8K page of user data denoted as A3 and A4.

Thus, each 8K byte page of the LUN A" 420 is formed from two logically consecutive sequential 4K byte pages of user data on the LUN A 410. For example, the 8K byte page 0 of LUN A" 420 corresponds to the first two logically consecutive 4K byte pages 0 and 1 of LUN A 410; and the 8K byte page 1 of LUN A" 420 corresponds to the two logically consecutive 4K byte pages 2 and 3 of LUN A 410.

In the example 400, the elements 410 and 420 denote the data content stored on the different logical address locations or offsets of the LUN A and LUN A" at the same point in time. In particular, using the snap diff technique, the remote replication facility 314 may determine that the 4K byte page 0 (410a) of the LUN A includes the user data "A1 NEW" denoting the user data of the LUN A that has been modified since the previous snapshot, where the user data "A1 NEW" 410a needs to be replicated to the target or hybrid system 420. The element 420a denotes the prior or old user data stored in the first 4K bytes of the LUN A" 420 that needs to be updated with the new user data "A1 NEW" (410a).

In accordance with the techniques herein, the AFA or source data storage system may perform processing to construct the 8K byte target page for use by the hybrid or target data storage system. The 8K byte target page may be aligned to an 8K byte boundary in the logical address space of the LUN A. The processing may include performing a step S1 and determining that the 4K byte page 0 410a includes the changed user data. As noted above, the step S1 may include using the snap diff technique discussed elsewhere herein. From the step S1, processing may proceed to the step S2.

At the step S2, two BE read I/Os may be performed on the source system or AFA to read the user data pages 0 (410a) and 1 (410b). The 4K byte page 0 410a of changed user data may be read from the BE PDs on the source system or AFA. Additionally, in the step S2, the additional 4K byte page 1 410b including the user data A2 may be read from the BE PDs on the source system or AFA. The two 4K byte user data pages 410a-b just read in the step S2 may be stored in a buffer or cache location 432 containing the 8K byte of user data of the constructed 8K byte target page. Following the step S2, a step S3 may be performed which transfers the 8K byte target page of user data 432 from the buffer or cache location of the AFA or source system to the hybrid or target system. Following the step S3, the 8K byte target page of user data may be received by the hybrid or target system. In response to receiving the target page of 8K bytes of user data, the hybrid or target system may perform a single BE write that writes the 8K bytes of user data 430 to page 0 of the LUN A" 420 thereby overwriting the two 4K byte chunks of user data 420a-b.

In at least one embodiment, both the source system or AFA and the target or hybrid system may have a persistent write cache implemented as a log-based write cache where write data and received host or client write I/O operations are sequentially recorded to a non-volatile storage log-based device and then later destaged from the cache to the BE PDs. The destaging is performed by flushing the recorded write I/O operations from the log-based device where the recorded write I/O operations and write data are applied to the non-volatile BE PDs provisioned for use in storing the write data written to a target logical address of the write I/O operations. Once the write I/O operation and write data are written to the log-based device, successful completion of the write I/O may be sent to the client, such as a host, that originated the write I/O. The write cache may be implemented as a log in which each subsequent write I/O and write data (e.g., write I/O payload) is recorded in a next logically sequential record of the log. The log may be circular in nature in that once a write operation is recorded in the last record of the log, recording of the next write proceeds with recording in the first record of the log.

With reference to FIGS. 3 and 4 and to further illustrate the above-described example, the source data storage system 310 may receive a write I/O operation 315 from a host. The write I/O operation 315 may write the content "A1 NEW" to the offset or LBA 0 of LUN A. The write I/O operation 315 may be recorded as the record 316a in the log file 316 of the source system 310 where the content or data written by the logged write I/O operation is subsequently destaged at a later point in time to non-volatile storage of the BE PDs of the source system 310 provisioned for LUN A 312a. An acknowledgement regarding completion of the write I/O operation may be sent to the host after the write I/O 315 is recorded in the record 316a of the persistently stored log file 316. Independently, the remote replication facility 314 may determine that the content of page 0 410a of the LUN A on the source system 310 has been updated and needs to be replicated to the target system 320. Accordingly, the remote replication facility 314 may perform processing to construct the 8K byte target page by issuing a first read that reads the updated 4K byte user data page 0 410a of the LUN A 312a from the BE PDs of the source system, issuing a second read that reads the existing 4K byte user data page 1 410b of the LUN A 312a from the BE PDs of the source system, and storing the two 4K byte user data pages 410a, 410b in the buffer or cache location 432 in memory of the source system 310. The buffer or cache location in memory may be 8K bytes in size and denote the constructed target page of 8K bytes of user data. Subsequently, the target page of 8K bytes of user data 432 is transferred from the source system 310 to the target system 320 by the remote replication facility 314. Additionally, the source system 310 provides other information also transferred with the target page of 8K bytes of user data. The other information may include, for example, the target location on the LUN A" 312b where the 8K bytes of user data of the target page is to be written. In response to receiving the target page of 8K bytes of user data and the target location, the target system 320 may log the write I/O operation 326a in its log file 326. The log record 326a of the write I/O operation may indicate to store the target page of user data ("A1 NEW A2") at the target location LUN A" at offset 0. Once the write I/O operation is recorded in the record 326a in the log file 326, the target system 320 may provide an acknowledgement to the source system 310 regarding successful completion of the write I/O operation that writes the target page of 8K bytes of user data to the LUN A" 312b. At a later point in time subsequent to recording the write I/O operation in the log file 326, the recorded write I/O 326a of the log file 326 may be flushed where the target page of 8K bytes of user data of the record 326a is written out to physical storage on the BE PDs of the target system for the LUN A" 312b.

The typical I/O pattern for each of the log files 316, 326 as a result of recording write I/Os and possibly other information in successive consecutive log file records includes logically sequential and logically contiguous writes (e.g., logically with respect to the logical offset or ordering within the log file). Data may also be read from the log file as needed (e.g., depending on the particular use or application of the log file) so typical I/O patterns may also include reads. The log file data may have a physical storage layout corresponding to the sequential and contiguous order in which the data is written to the log file. Thus, the log file data may be written to sequential and consecutive physical storage locations in a manner corresponding to the logical sequential and contiguous order of the data in the log file. Additional detail regarding use and implementation of the log files 316, 326 in at least one embodiment in accordance with the techniques herein is provided below.

Figure 5:
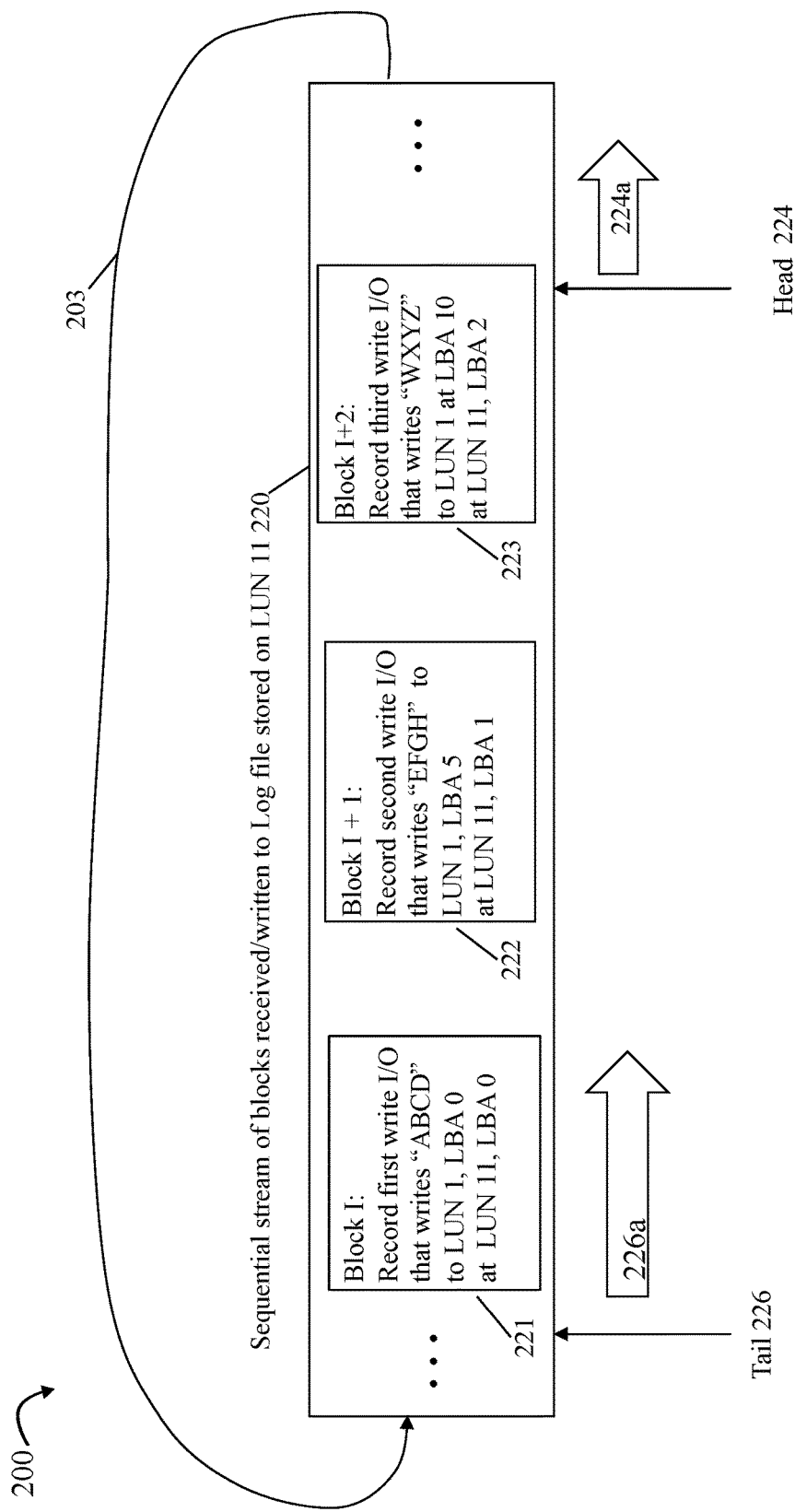
FIGS. 5 and 6 are examples illustrating use of a log file in an embodiment in accordance with the techniques herein.

Referring to FIG. 5, shown is an example 200 illustrating a sequential stream 220 of pages or blocks received that are written to a log file in an embodiment in accordance with techniques herein. In this example, the log file may be stored on LUN 11 where logged updates, such as write I/Os that write user data to a file, target LUN or other storage object, are recorded as records in the log file. The element 220 includes information or records of the log file for 3 write I/Os or updates which are recorded in records or blocks I 221, I+1 222 and I+2 223 of the log file (e.g., where I denotes an integer offset of a record or logical location in the log file). The blocks I 221, I+1 222, and I+2 223 may be written sequentially in the foregoing order for processing in the data storage system. The block 221 may correspond to the record or block I of the log file stored at LUN 11, LBA 0 that logs a first write I/O operation. The first write I/O operation may write "ABCD" to the target logical address LUN 1, LBA 0. The block 222 may correspond to the record or block I+1 of the log file stored at LUN 11, LBA 1 that logs a second write I/O operation. The second write I/O operation may write "EFGH" to the target logical address LUN 1, LBA 5. The block 223 may correspond to the record or block I+2 of the log file stored at LUN 11, LBA 2 that logs a third write I/O operation. The third write I/O operation may write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 5, the information recorded in each of the foregoing records or blocks 221, 222 and 223 of the log file may include the target location to which data is written and the write data written to the target location.

The head pointer 224 may denote the next free record or block of the log file used to record or log the next write I/O operation. The head pointer may be advanced 224a to the next record or log in the log file as each next write I/O operation is recorded. When the head pointer 224 reaches the end of the log file by writing to the last sequential block or record of the log file, the head pointer may advance 203 to the first sequential block or record of the log in a circular manner and continue processing. The tail pointer 226 may denote the next record or block of a recorded write I/O operation in the log file to be destaged and flushed from the log file. Recorded or logged write I/Os of the log file are processed and flushed whereby the recorded write I/O operation that writes to a target location (e.g., target LUN and offset) is read from the log file and then executed or applied to a non-volatile BE PD location mapped to the target location (e.g., where the BE PD location stores the data content of the target location). Thus, as records are flushed from the log file, the tail pointer 226 may logically advance 226a sequentially (e.g., advance to the right toward the head pointer and toward the end of the log file) to a new tail position. Once a record or block of the log file is flushed, the record or block is freed for reuse in recording another write I/O operation. When the tail pointer reaches the end of the log file by flushing the last sequential block or record of the log file, the tail pointer may advance 203 to the first sequential block or record of the log in a circular manner and continue processing. Thus, the circular logical manner in which the records or blocks of the log file are processed form a ring buffer in which the write I/Os are recorded.

When a write I/O operation writing user data to a target location is persistently recorded and stored in the non-volatile log file, the write I/O operation is considered complete and may be acknowledged as complete to the host or other client originating the write I/O operation to reduce the write I/O latency and response time. The write I/O operation and write data are destaged at a later point in time during a flushing process that flushes a recorded write of the log file to the BE non-volatile PDs, updates and writes any corresponding metadata for the flushed write I/O operation, and frees the record or block of the log file (e.g., where the record or block logged the write I/O operation just flushed). The metadata that may be updated as part of the flushing process for the target location of the write I/O operation may include mapping information as described elsewhere herein. The mapping information of the metadata for the target location may identify the physical address or location on provisioned physical storage on a non-volatile BE PD storing the data of the target location. The target location may be, for example, a logical address on a logical device, such as a LUN and offset or LBA on the LUN.

An embodiment in accordance with the techniques herein may have the source system or AFA and the target or hybrid system each use a log file as described herein to log or record writes and other operations that perform data modifications or updates. For example, the log file as described and illustrated in the FIG. 5 may be used. The log file may be stored persistently on non-volatile memory or storage, such as in a fast non-volatile memory. In at least one embodiment, the log files 316, 326 may be stored on non-volatile RAM, respectively, of the system 310, 320.

Figure 6:
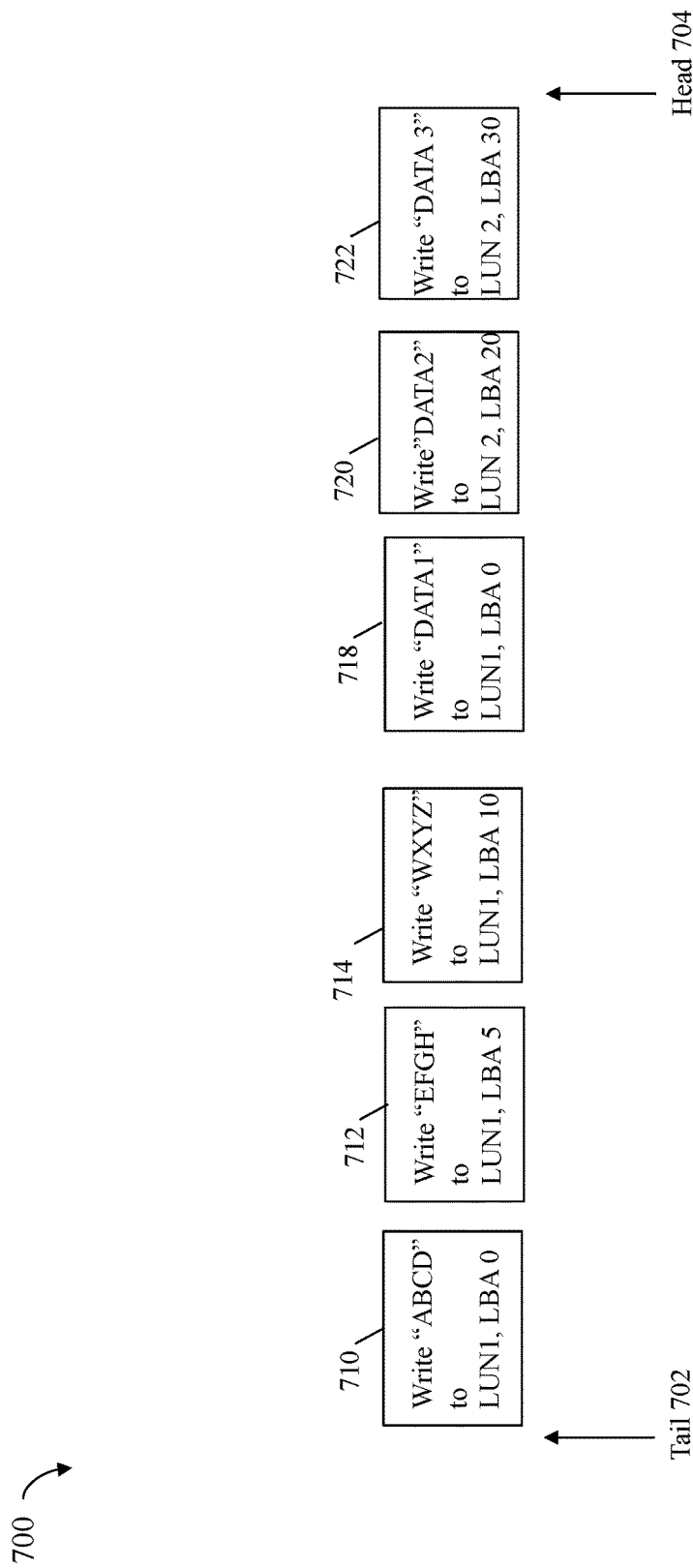

Referring to FIG. 6, shown is an example of information that may be included in a log file in an embodiment in accordance with the techniques herein.

The example 700 includes head pointer 704 and tail pointer 702. The elements 710, 712, 714, 718, 720 and 722 denote 6 records of the log file for 6 write I/O operations recorded in the log. The element 710 is a log record for a write operation that writes "ABCD" to LUN 1, LBA 0. The element 712 is a log record for a write operation that writes "EFGH" to LUN 1, LBA 5. The element 714 is a log record for a write operation that writes "WXYZ" to LUN 1, LBA 10. The element 718 is a log record for a write operation that writes "DATA1" to LUN 1, LBA 0. The element 720 is a log record for a write operation that writes "DATA2" to LUN 2, LBA 20. The element 722 is a log record for a write operation that writes "DATA3" to LUN 2, LBA 30. As illustrated in FIG. 6, the log records 710, 712, 714, 718, 720 and 722 may also record the write data (e.g., write I/O operation payload) written by the write operations. It should be noted that the log records 710, 712 and 714 of FIG. 6 correspond respectively to the log records 221, 222 and 223 of FIG. 5.

The log file may be flushed sequentially to maintain desired data consistency. In order to maintain data consistency when flushing the log file, constraints may be placed on an order in which the records of the log file are flushed or logically applied to the stored data while still allowing any desired optimizations. Such constraints may consider any possible data dependencies between logged writes and other logged operations in order to ensure write order consistency.

Figure 7:
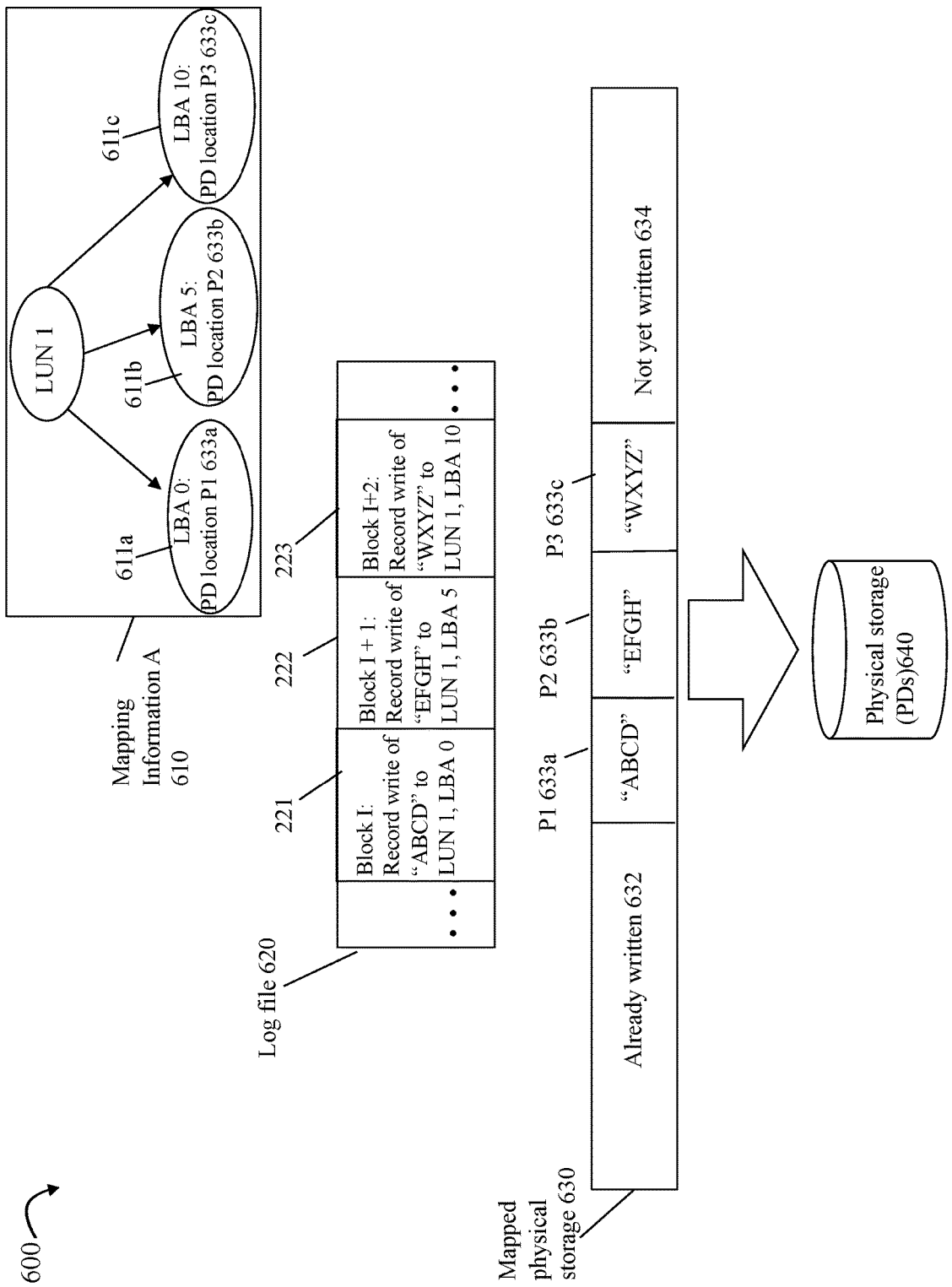
FIG. 7 is an example illustrating flushing a log file in an embodiment in accordance with the techniques herein.

Referring to FIG. 7, shown is an example 600 illustrating the flushing of logged writes and the physical data layout of user data on BE PDs in at least one embodiment in accordance with the techniques herein. FIG. 7 includes the log file 620, the mapping information A 610, and the physical storage (i.e., BE PDs) 640. The element 630 represents the physical layout of the user data as stored on the physical storage 640. The element 610 may represent the logical to physical storage mapping information A 610 created for 3 write I/O operations recorded in the log records or blocks 221, 222 and 223.

The mapping information A 610 includes the elements 611a-c denoting the mapping information, respectively, for the 3 target locations of the 3 recorded write I/O operations in the log records 221, 222, and 223. The element 611a of the mapping information denotes the mapping information for the target location LUN1, LBA 0 of the block 221 of the log file 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target location LUN1, LBA 5 of the block 222 of the log file 620. In particular, the block 222 and mapping information 611*b* indicate that the user data "EFGH" written to LUN 1, LBA 5 is stored at the physical location (PD location) P2 633*b* on the physical storage 640. The element 611*c* of the mapping information denotes the mapping information for the target location LUN 1, LBA 10 of the block 223 of the log file 620. In particular, the block 223 and mapping information 611 indicate that the user data "WXYZ" written to LUN 1, LBA 10 is stored at the physical location (PD location) P3 633*c* on the physical storage 640.

The mapped physical storage 630 illustrates the sequential contiguous manner in which user data may be written to the physical storage 640 as the log file records or blocks are flushed. In this example, the records of the log file 620 may be flushed and processing sequentially (e.g., such as described in connection with FIG. 5) and the user data of the logged writes may be sequentially written to the mapped physical storage 630 as the records of the log file are sequentially processed. As the user data pages of the logged writes to the target locations are written out to sequential physical locations on the mapped physical storage 630, corresponding mapping information for the target locations may be updated. The user data of the logged writes may be written to mapped physical storage sequentially as follows: 632, 633*a*, 633*b*, 633*c* and 634. The element 632 denotes the physical locations of the user data written and stored on the BE PDs for the log records processed prior to the block or record 221. The element 633*a* denotes the PD location P1 of the user data "ABCD" stored at LUN 1, LBA 1. The element 633*b* denotes the PD location P2 of the user data "EFGH" stored at LUN 1, LBA 5. The element 633*c* denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log file 620 as stored on non-volatile storage may also be physically sequential and contiguous where the non-volatile storage used for the log file may be viewed logically as one large log having data that is laid out sequentially in the order it is written to the log.

The data layout of the user data as storage on the BE PDs may also be physically sequential and contiguous. As log records of the log file 620 are flushed, the user data written by each flushed log record may be stored at the next sequential physical location on the BE PDs. Thus, flushing the log file may result in sequential writes of user data pages or blocks to consecutive physical locations on the BE PDs.

Figure 8:
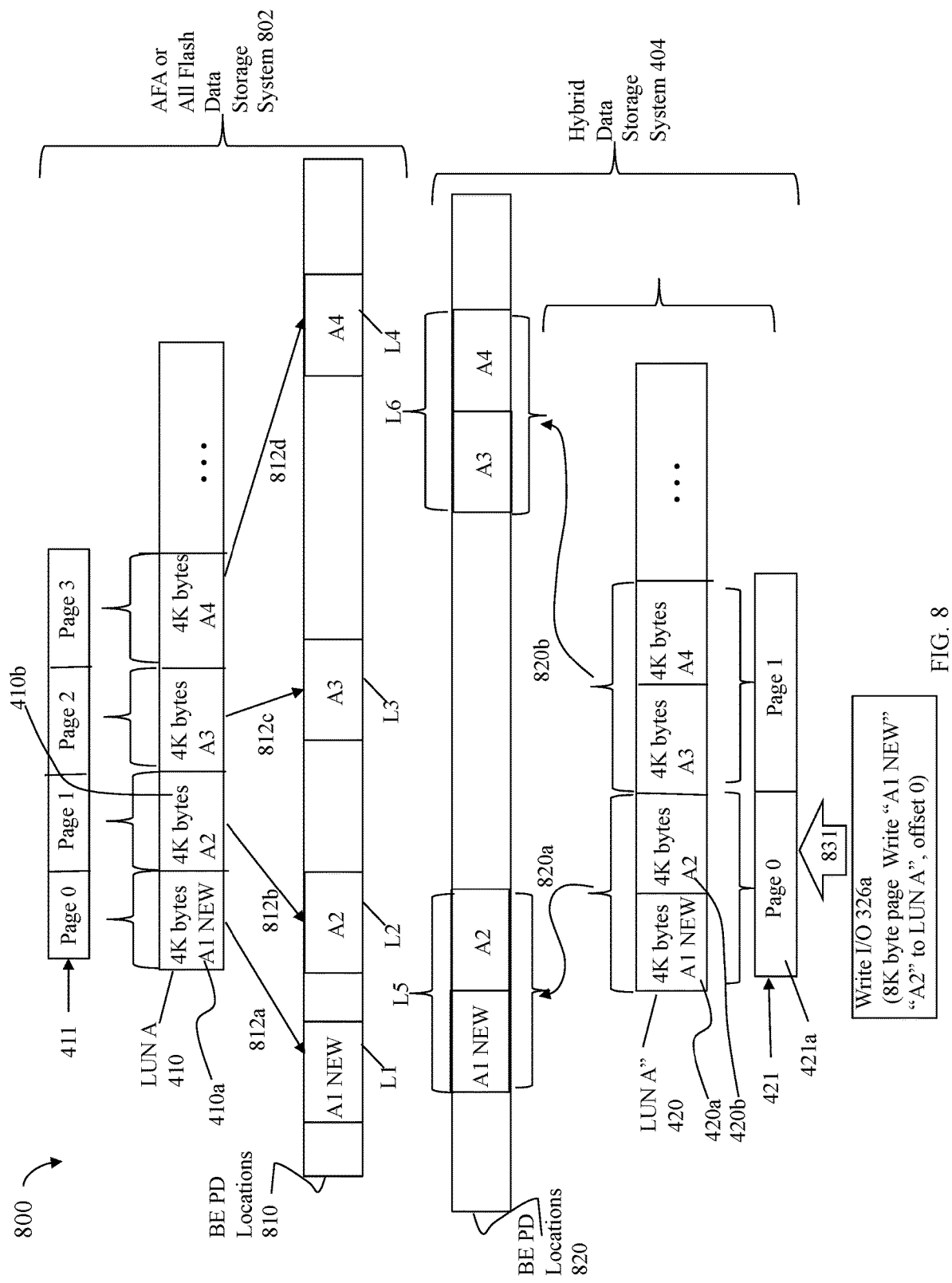
FIG. 8 is an example illustrating the user data stored on the backend physical data storage of an all flash data storage system and a hybrid data storage system in an embodiment in accordance with the techniques herein.

With reference back to the example described in connection with the FIGS. 3 and 4, reference is now made to FIG. 8. FIG. 8 illustrates the state of the source and target data storage systems of FIG. 3 after the recorded write I/O operation 316*a* of the log file 316 of the source system has been flushed to the physical storage of the BE PDs of the source system provisioned for the LUN A 312*a*, and also after the recorded write I/O operation 326*a* of the log file 326 of the target system 320 has been flushed to the physical storage of the BE PDs of the target system provisioned for the LUN A" 312*b*.

In the example 800, the element 802 denotes the state of the AFA or all flash data storage system 802 which in this example is the source system 310 as in FIG. 3; and the element 804 denotes the state of the hybrid data storage system which in this example is the target system 320 as in FIG. 3.

In connection with the AFA or all flash data storage system 802, the elements 410 and 411 are as described above in connection with FIG. 4. The element 410 denotes the content stored at the various logical offsets or address in the logical address space of the LUN A on the AFA or all flash data storage system for the 4K user data pages denoted by the element 411. The element 810 represents the content stored on the BE PD locations 810 of the BE PDs of the AFA or all flash data storage system. The elements 812*a-d*, respectively, denote the mappings from the 4K byte user data pages 0-3 of the logical address space of the LUN A 410 to corresponding locations L1-L4 on the BE PDs of the AFA or all flash data storage system. Consistent with other discussion herein, the mappings 812*a-d* represent the mappings of the location information of the metadata used on the AFA or all flash data storage system. In connection with processing performed in connection with the techniques herein as discussed above, the remote replication facility performs two BE read operations to read the two 4K byte pages of user data 410*a*, 410*b*. The pages 410*a-b* comprising the 8K target page of user data are logically consecutive pages in the logical address space 410 of the LUN A. The mapping information as represented by 812*a-b* is used to read the two 4K byte pages of user data (e.g., read "A1 NEW" and "A2") from the locations L1 and L2 on the BE PDs of the AFA or all flash data storage system.

In connection with the hybrid data storage system 804, the elements 420 and 421 are as described above in connection with FIG. 4 with the difference that the element 420 illustrates the user data stored at the various 8K byte pages of user data after the logged write I/O 326*a* has been destaged to the BE PD locations 820 of the BE PDs of the hybrid data storage system. The element 420 denotes the content stored at the various logical offsets or address in the logical address space of the LUN A" on the hybrid data storage system for the 8K byte user data pages denoted by the element 421. The element 820 represents the content stored on the BE PD locations 820 of the BE PDs of the hybrid data storage system. The elements 820*a-b*, respectively, denote the mappings from the 8K byte user data pages 0-1 of the logical address spaces of the LUN A 420" to corresponding locations L5-L6 on the BE PDs of the hybrid data storage system. Consistent with other discussion herein, the mappings 820*a-b* represent the mappings of the location information of the metadata used on the hybrid data storage system. In connection with processing performed in connection with the techniques herein as discussed above, the remote replication facility sends the constructed target page of 8K bytes of user data which is received by the hybrid data storage system. The target page of 8K bytes of user data (containing the updated 4K byte page with the user data "A1 NEW" and the current or original 4K byte page with the user data "A2") is stored in the log record 326*a* and then when flushed, is subsequently written 831 as the updated page 0 421*a* at the logical address 0 of the LUN A" 420. The 8K byte user data page 421*a* in the hybrid data storage system includes two 4K byte pages of user data 420*a-b* which are stored at sequential consecutive locations on a BE PD of the hybrid data storage system as denoted by the BE PD location L5. The two 4K byte pages of user data 420*a-b* are stored at consecutive sequential logical addresses in the logical address space of the LUN A" 420.

In at least one embodiment, the target page of 8K bytes of user data transferred from the source system 310, such as the AFA or all flash data storage system, to the target system 320, such as the hybrid data storage system, may be uncompressed. As a variation, an embodiment may alternatively transfer compressed data. In this latter case where the target page of 8K bytes of user data is transferred in its compressed form, processing performed may include obtaining the two 4K byte pages 410*a-b* of user data in its original uncompressed form. If the source system stores the two 4K byte pages 410*a-b* in uncompressed form, then the pages 410*a-b* may be read from the BE PDs of the source system. If the source system stores the two 4K byte pages 410*a-b* in compressed form, then the compressed form of the pages 410*a-b* are read from the BE PDs of the source system and uncompressed. Subsequently, processing may include compressing the uncompressed form of the two 4K byte pages 410*a-b* as a single 8K byte data chunk, and then transferring the compressed form of the single 8K byte data chunk as the target page from the source system to the target system. The target page including the compressed form of the 8K byte data chunk may be received and further processed by the target system as needed in accordance with whether the target system stores data in its compressed or uncompressed form.

As described above, in at least one embodiment, the AFA or all flash data storage system and the hybrid data storage system may have both utilize log files for recording write operations and may both flush the log files to the BE PDs of their respective systems. The logged writes may be to random target logical addresses and the logged writes may be recorded sequentially in physically consecutive locations of the log file. The sequential consecutive records of the log file to which writes are recorded may be located at physical locations that are also sequential and consecutive on the log file device.

The AFA or all flash data storage system may store both the user data and the metadata as described herein on flash drives or non-volatile SSDs included in the BE PDs of the system. The hybrid data storage system may store the metadata as described herein on flash drives or non-volatile SSDs included in the BE PDs for the system, and may store user data on the HDDs included in the BE PDs of the system. In such an embodiment, the flushing of the log file on the AFA or all flash data storage system results in sequential consecutive writes of the updated data to sequential consecutive physical locations on the BE PDs of the system. In a similar manner, the flushing of the log file on the hybrid data storage system results in sequential consecutive writes of the updated data to sequential consecutive physical locations on the BE PDs of the system.

In the example embodiment described above where the source system has 4K byte user data pages and the target system has 8K byte user data pages, the source system constructs the 8K byte target page of user data corresponding to the target page as used on the target system. In constructing the 8K byte target page, the source system performs two 4K byte page reads from its BE PDs—one 4K byte page of new or modified user data and an additional 4K byte page of data that has not been modified as currently stored on the BE PDs. The target page of the 8K bytes of user data is stored on the target system as a single 8K byte page. Thus the additional 4K byte page of user data and the new or modified 4K byte page of user data may be logically stored at sequential consecutive logical addresses. For example as noted a above in the FIGS. 4 and 8, the 4K byte page 410*a* of the modified user data may be stored at LUN A, LBA 0 or offset 0. The source system may obtain from its BE PDs the additional 4K byte page of user data 410*b* that has not been modified which may correspond to the logical address LUN 5, offset=4K bytes (i.e., or LBA 1 where each block is 4K bytes on the source system). The source system may then construct the 8K byte page of user data to include both the foregoing modified 4K page 410*a* of user data for LUN A LBA 0 and the additional 4K page of user data (for LUN A, LBA 1 or offset 4K) that has not been modified. In this manner, the source system constructs the target page of 8K bytes of user data as used on the target system. In a similar manner, the source system may construct aligned target pages of other page size granularities that may vary with the target system, where the aligned target page includes the changed or modified user data along with one or more other user data pages from the source system.

In at least one embodiment, the target or hybrid system may be used for both disaster recovery purposes as well as serve as an active production site hosting data accessed by hosts or other client for other purposes besides disaster recovery. In such an embodiment, the replication data transferred to the target system may be stored on only the HDDs and not the SSDs of the BE PD since the SSDs may be used for other purposes to improve I/O performance such as, for example, for selectively storing user data that is hot or frequently accessed by the hosts or other clients. As an alternative to the foregoing, in at least one embodiment, the target or hybrid system may only be used for disaster recovery purposes and not also simultaneously actively hosting data accessed by clients. In this case, the SSDs of the BE PDs of the target system may be available for use with storing the replication data on the target system. In such an embodiment the SSDs of the BE PDs of the target system may be used for storing the replication data as well as the HDDs of the BE PDs of the target system. For example, to improve flush time from the log file on the target system, if there is available storage on the SSDs, records of the log file may be flushed first to a temporary location on an SSD and then from the temporary location on the SSD to a BE PD location on the HDDs. In this manner, the flush time from the log file may be improved by using the SSDs as a temporary intermediate location.

In such an embodiment as described herein, the target or hybrid data storage system has a worst case performance that may improve the data transfer bandwidth by about 100 times as compared to a system that does not use the techniques herein and requires the target system to perform random RMWs. In connection with the techniques herein, the worst case performance is bounded by the sequential write performance to the HDDs of the BE PDs of the target system as compared to, for example, being bound by the random read performance in a system that does not use the techniques herein and requires the target system to perform random RMWs. For example, consider a target system where the user data is stored on 10 HDDs of the BE PDs of the target system. Each HDD may have a random read throughput of about 150 random reads per second and, assuming a 4K byte page size the 10 HDDs, the overall transfer bandwidth when requiring the target system to perform the random RMWs may be about 6 megabytes (MBs)/second. In contrast to performing random reads with the random RMWs, an embodiment in accordance with the techniques herein has an improved bandwidth and performance which the inventors have determined to be about 100 times for certain HDDs. For example, rather than have being bound by a data transfer rate for random reads for the 10 HDDs of about 6 MBs/second, an embodiment in accordance with the techniques herein may alternatively have a worst-case performance of about 600 MBs/second when sequentially writing to the 10 HDDs.

Generally, the source data storage system may obtain the page size granularity of the target data storage system in any suitable manner that may vary with embodiment and application or use of the techniques herein. In at least one embodiment in which the techniques herein are utilized in connection with remote data replication as described above, a replication session may be established or set up between the source and target systems. Establishing the replication session may include performing a handshake flow in which information is exchanged between the source and target systems. The information may include one or more parameters or settings for the replication session. In an embodiment in accordance with the techniques herein, the target data storage system may provide its page size granularity, such as the 8K byte page size in the example above, to the source data storage system as one of the parameters or settings for the replication session.

It should be noted that although the above example illustrates constructing a target page of 8K bytes where only one of the 4K byte pages of user data has been modified, more generally, the target page may include one or more pages of modified user data along with zero of more pages of unmodified user data, as needed, to construct the target page with the target page size granularity of the target system.

Figure 9:
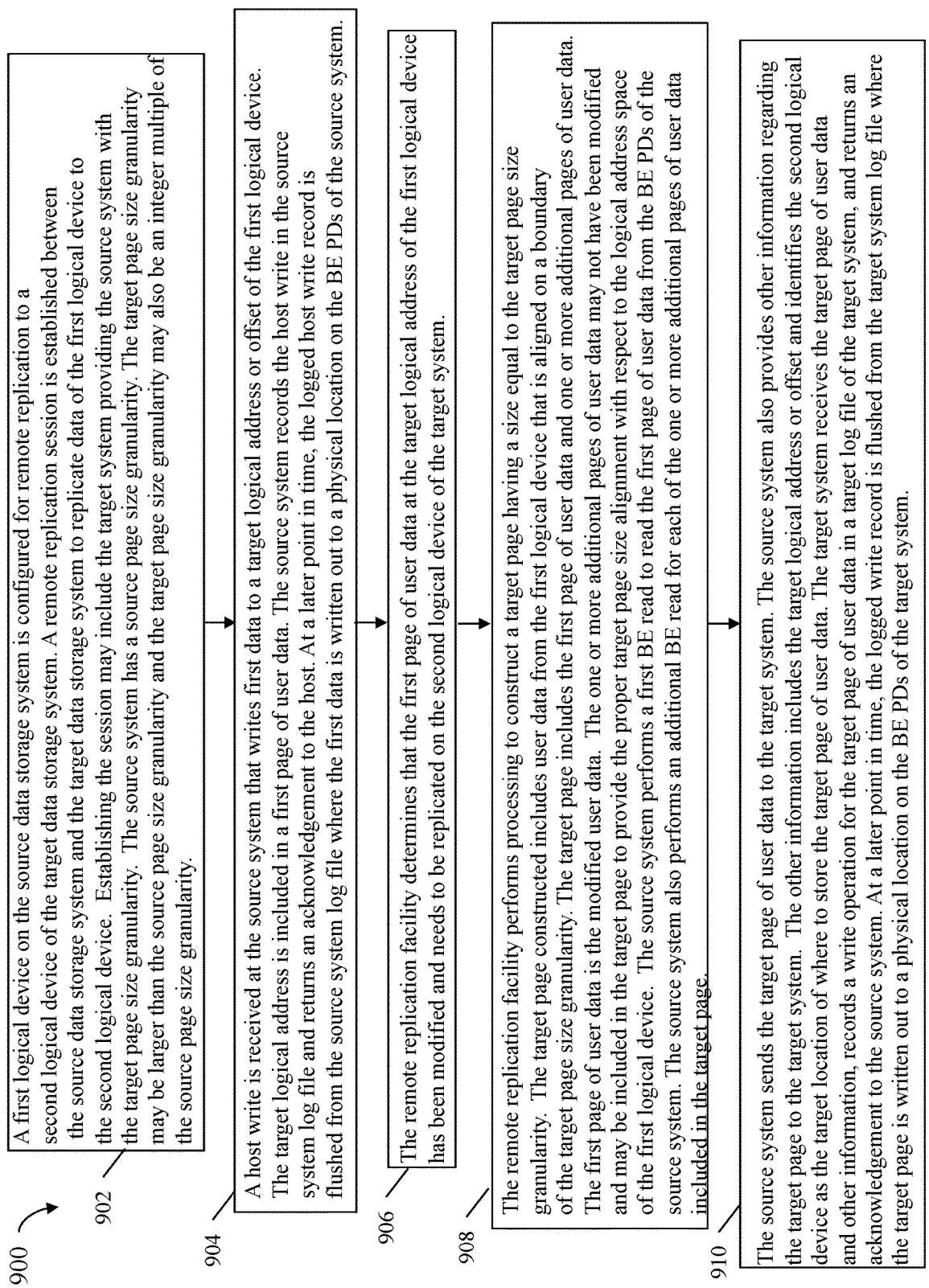
FIG. 9 is a flowchart of processing steps that can be performed in at least one embodiment in accordance with the techniques of the present disclosure.

Referring to FIG. 9, shown is a flowchart of processing steps that may be performed in an embodiment in accordance with the techniques herein. The flowchart 900 summarizes processing as described above in connection with performing the techniques herein with data replication.

At the step 902, a first logical device on the source data storage system is configured for remote replication to a second logical device of the target data storage system. Also in the step 902, a remote replication session is established between the source data storage system and the target data storage system to replicate data of the first logical device to the second logical device. Establishing the session in the step 902 may include the target system providing the source system with the target page size granularity. The source system has a source page size granularity. The target page size granularity may be larger than the source page size granularity and the target page size granularity may also be an integer multiple of the source page size granularity. From the step 902, control proceeds to the step 904.

At the step 904, a host write is received at the source system that writes first data to a target logical address or offset of the first logical device. The target logical address is included in a first page of user data. Also in the step 904, the source system records the host write in the source system log file and returns an acknowledgement to the host. At a later point in time, the logged host write record is flushed from the source system log file where the first data is written out to a physical location on the BE PDs of the source system. From the step 904, control proceeds to the step 906.

At the step 906, the remote replication facility of the source system determines that the first page of user data at the target logical address of the first logical device has been modified and needs to be replicated on the second logical device of the target system. From the step 906, control proceeds to the step 908.

At the step 908, the remote replication facility performs processing to construct a target page having a size equal to the target page size granularity. The target page constructed includes user data from the first logical device that is aligned on a boundary of the target page size granularity. The target page includes the first page of user data and one or more additional pages of user data. The first page of user data is the modified user data. The one or more additional pages of user data may not have been modified and may be included in the target page to provide the proper target page size alignment with respect to the logical address space of the first logical device. In the step 908 as part of the processing to construct the target page, the source system performs a first BE read to read the first page of user data from the BE PDs of the source system. The source system also performs an additional BE read for each of the one or more additional pages of user data included in the target page. From the step 908, control proceeds to the step 910.

At the step 910, the source system sends the target page of user data to the target system. In the step 901, the source system also provides other information regarding the target page to the target system. The other information includes the target logical address or offset and identifies the second logical device as the target location of where to store the target page of user data. In the step 910, the target system receives the target page of user data and other information, records a write operation for the target page of user data in a target log file of the target system, and returns an acknowledgement to the source system. At a later point in time, the logged write record is flushed from the target system log file where the target page is written out to a physical location on the BE PDs of the target system.

The steps 906, 908 and 910 may be repeated for each target page constructed by the source system where generally the target page includes multiple pages of user data of the source system where each of the multiple pages has the source page size granularity. Additionally, each of the multiple pages may generally include one or more pages of modified user data and zero of more pages of unmodified data.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of performing data transfers comprising:
receiving, at a source data storage system, a client write I/O operation from a host, wherein the client write I/O operation writes new user data to a first page of user data stored at a first logical address of a logical device, wherein the client write I/O operation modifies existing user data, as stored at the first logical address of the logical device prior to the client write I/O operation, by storing the new user data to the first logical address of the logical device;
responsive to the first client write I/O operation from the host, determining that the first page of user data including the new user data is to be transferred from the source data storage system to a target data storage system, wherein the source data storage system is a first data storage array and the target data storage system is a second data storage array, wherein the source data storage system and the target data storage system are separate physical data storage arrays connected by a network, wherein the source data storage system includes first backend non-volatile storage devices for storing user data and metadata, and wherein the target data storage system includes second backend non-volatile storage devices for storing user data and metadata, wherein the source data storage system has a source page size granularity denoting a first size of backend I/O operations on the source data storage system that read and write user data and metadata stored on the first backend non-volatile storage devices of the source data storage system, wherein the target data storage system has a target page size granularity that is different from the source page size granularity and denotes a second size of backend I/O operations on the target data storage system that read and write user data and metadata stored on the second backend non-volatile storage devices of the target data storage system, wherein the first page of user data is the first size and the first page of user data is stored at the first logical address of the logical device having physical storage provisioned from at least one of the first backend non-volatile storage devices of the source data storage system;

performing first processing on the source data storage system that constructs a second page of user data to be transferred from the source data storage system to the target data storage, wherein the second page of user data is the second size, wherein the second page of user data includes modified user data and unmodified user data, and wherein the modified user data of the second page of user data includes the first page of user data comprising the new user data written by the client write I/O operation, and wherein the unmodified user data of the second page includes an additional page of user data that is the first size; and transferring the second page of user data comprising the modified user data and the unmodified user data from the source data storage system to the target data storage system.

2. The method of claim 1, further comprising:
receiving the second page of user data at the target data storage system; and
performing a single backend write operation on the target data storage system, wherein the single backend write operation writes the second page of user data on a first backend non-volatile storage device of the second backend non-volatile storage devices of the target data storage system, wherein the first page of user data and the additional page of user data are stored at consecutive locations on the first backend non-volatile storage device of the target data storage system.

3. The method of claim 2, further comprising:
storing the second page of user data as a first record in a log file of the target data storage system; and
flushing the first record from the log file of the target data storage system, wherein said flushing the first record includes performing the single backend write operation on the target data storage system that writes the second page of user data on the first backend non-volatile storage device of the target data storage system.

4. The method of claim 3, wherein the first page of user data and the additional page of user data are stored at sequential consecutive logical addresses of the logical device.

5. The method of claim 1, wherein the source data storage system uses only non-volatile solid state drives (SSDs) as the first backend non-volatile storage devices of the source data storage system.

6. The method of claim 5, wherein the non-volatile SSDs include flash-based storage devices.

7. The method of claim 5, wherein the second backend non-volatile storage devices of the target data storage system include non-volatile SSDs and rotating disk drives.

8. The method of claim 7, wherein the source data storage system uses first metadata to map user data pages stored at logical addresses of one or more logical devices to corresponding physical storage locations on the first backend non-volatile storage devices of the source data storage system, wherein the target data storage system uses second metadata to map user data pages stored at logical addresses of one or more logical devices to corresponding physical storage locations on the second backend non-volatile storage devices of the target data storage system, wherein the source data storage system stores user data pages and the first metadata on non-volatile SSDs of the first backend non-volatile storage devices, and wherein the target data storage system stores the second metadata on non-volatile SSDs of the second backend non-volatile storage devices and at least some of user data pages on rotating disk drives of the second backend non-volatile storage devices.

9. The method of claim 1, wherein the second page of user data is transferred from the source data storage system to the target data storage system in connection with replicating data of the logical device from the source data storage system to the target data storage system.

10. The method of claim 9, further comprising:
taking a first snapshot of the logical device on the first data storage system at a first point in time;
taking a second snapshot of the logical device on the first data storage system at a second point in time; and
determining the first page of user data as a data difference between the first snapshot and the second snapshot.

11. The method of claim 10, wherein prior to determining the first page of user data, prior to performing the first processing and prior to transferring the second page of user data, the method includes establishing a replication session comprising:
sending the target page size granularity from the target data storage system to the source data storage system.

12. The method of claim 1, wherein the second page of user data is transferred from the source data storage system to the target data storage system in connection with migrating data of the logical device from the source data storage system to the target data storage system.

13. The method of claim 1, wherein the backend I/O operations of the source data storage system include read operations that each read an amount of data equal to the source page size granularity from one of the first backend non-volatile storage devices of the source data storage system, and wherein the backend I/O operations of the source data storage system include write operations that each write an amount of data equal to the source page size granularity to one of the first backend non-volatile storage devices of the source data storage system.

14. The method of claim 1, wherein the backend I/O operations of the target data storage system include read operations that each read an amount of data equal to the target page size granularity from one of the second backend non-volatile storage devices of the target data storage system, and wherein the backend I/O operations of the target data storage system include write operations that each write an amount of data equal to the target page size granularity to one of the second backend non-volatile storage devices of the target data storage system.

15. The method of claim 1, wherein the target page size granularity is larger than the source page size granularity and wherein the target page size granularity is an integer multiple of the source page size granularity.

16. The method of claim 15, wherein the target page size granularity is at least twice the source page size granularity.

17. A system comprising:
one or more processors; and
one or more memories comprising code stored thereon that, when executed, performs a method of performing data transfers comprising:
receiving, at a source data storage system, a client write I/O operation from a host, wherein the client write I/O operation writes new user data to a first page of user data stored at a first logical address of a logical device, wherein the client write I/O operation modifies existing user data, as stored at the first logical address of the logical device prior to the client write I/O operation, by storing the new user data to the first logical address of the logical device;
responsive to the first client write I/O operation from the host, determining that the first page of user data including the new user data is to be transferred from the source data storage system to a target data storage system, wherein the source data storage system is a first data storage array and the target data storage system is a second data storage array, wherein the source data storage system and the target data storage system are separate physical data storage arrays connected by a network, wherein the source data storage system includes first backend non-volatile storage devices for storing user data and metadata, and wherein the target data storage system includes second backend non-volatile storage devices for storing user data and metadata, wherein the source data storage system has a source page size granularity denoting a first size of backend I/O operations on the source data storage system that read and write user data and metadata stored on the first backend non-volatile storage devices of the source data storage system, wherein the target data storage system has a target page size granularity that is different from the source page size granularity and denotes a second size of backend I/O operations on the target data storage system that read and write user data and metadata stored on the second backend non-volatile storage devices of the target data storage system, wherein the first page of user data is the first size and the first page of user data is stored at the first logical address of the logical device having physical storage provisioned from at least one of the first backend non-volatile storage devices of the source data storage system;
performing first processing on the source data storage system that constructs a second page of user data to be transferred from the source data storage system to the target data storage, wherein the second page of user data is the second size, wherein the second page of user data includes modified user data and unmodified user data, and wherein the modified user data of the second page of user data includes the first page of user data comprising the new user data written by the client write I/O operation, and wherein the unmodified user data of the second page includes an additional page of user data that is the first size; and
transferring the second page of user data comprising the modified user data and the unmodified user data from the source data storage system to the target data storage system.

18. A non-transitory computer readable memory comprising code stored thereon that, when executed, performs a method of performing data transfers comprising:
receiving, at a source data storage system, a client write I/O operation from a host, wherein the client write I/O operation writes new user data to a first page of user data stored at a first logical address of a logical device, wherein the client write I/O operation modifies existing user data, as stored at the first logical address of the logical device prior to the client write I/O operation, by storing the new user data to the first logical address of the logical device;
responsive to the first client write I/O operation from the host, determining that the first page of user data including the new user data is to be transferred from the source data storage system to a target data storage system, wherein the source data storage system is a first data storage array and the target data storage system is a second data storage array, wherein the source data storage system and the target data storage system are separate physical data storage arrays connected by a network, wherein the source data storage system includes first backend non-volatile storage devices for storing user data and metadata, and wherein the target data storage system includes second backend non-volatile storage devices for storing user data and metadata, wherein the source data storage system has a source page size granularity denoting a first size of backend I/O operations on the source data storage system that read and write user data and metadata stored on the first backend non-volatile storage devices of the source data storage system, wherein the target data storage system has a target page size granularity that is different from the source page size granularity and denotes a second size of backend I/O operations on the target data storage system that read and write user data and metadata stored on the second backend non-volatile storage devices of the target data storage system, wherein the first page of user data is the first size and the first page of user data is stored at the first logical address of the logical device having physical storage provisioned from at least one of the first backend non-volatile storage devices of the source data storage system;
performing first processing on the source data storage system that constructs a second page of user data to be transferred from the source data storage system to the target data storage, wherein the second page of user data is the second size, wherein the second page of user data includes modified user data and unmodified user data, and wherein the modified user data of the second page of user data includes the first page of user data comprising the new user data written by the client write I/O operation, and wherein the unmodified user data of the second page includes an additional page of user data that is the first size; and
transferring the second page of user data comprising the modified user data and the unmodified user data from the source data storage system to the target data storage system.

* * * * *